US012714931B2

(12) United States Patent
Tilley et al.

(10) Patent No.: US 12,714,931 B2
(45) Date of Patent: Aug. 25, 2026

(54) CLEANING DEVICE FOR CONTACTING SURFACES OF SPORTS EQUIPMENT

(71) Applicant: Sean David Tilley, Castle Rock, CO (US)

(72) Inventors: Sean David Tilley, Castle Rock, CO (US); Bruce Leonard Tilley, Thornton, CO (US)

( * ) Notice: Subject to any disclaimer, the term of this patent is extended or adjusted under 35 U.S.C. 154(b) by 75 days.

(21) Appl. No.: 18/506,532

(22) Filed: Nov. 10, 2023

(65) Prior Publication Data

US 2024/0156221 A1 May 16, 2024

Related U.S. Application Data

(60) Provisional application No. 63/383,321, filed on Nov. 11, 2022.

(51) Int. Cl.

| | |
|---|---|
| ***A63C 5/06*** | (2006.01) |
| ***A45B 3/00*** | (2006.01) |
| ***A46B 5/00*** | (2006.01) |
| ***A46B 9/02*** | (2006.01) |
| ***A47L 23/04*** | (2006.01) |
| ***A63C 11/18*** | (2006.01) |
| ***A63C 11/22*** | (2006.01) |
| ***B08B 1/16*** | (2024.01) |

(52) U.S. Cl.

CPC ................ *A63C 5/061* (2013.01); *A45B 3/00* (2013.01); *A46B 5/0095* (2013.01); *A46B 9/025* (2013.01); *A46B 9/026* (2013.01); *A47L 23/04* (2013.01); *A63C 11/18* (2013.01); *A63C 11/22* (2013.01); *B08B 1/165* (2024.01); *A45B 2200/05* (2013.01); *A46B 2200/306* (2013.01)

(58) Field of Classification Search

CPC ......... A63C 5/061; A63C 11/18; A63C 11/22; A45B 3/00; A47L 23/04; A47L 23/02; A47L 13/02; A46B 2200/306; A46B 3/08; A46B 3/22; A46B 13/001; A46B 13/005; A46B 7/10; B08B 9/021; B44D 3/006; B60S 3/045

USPC ................. 280/813; 15/237, 236.01, 236.05, 15/236.08, 105, 161; 30/329, 342

See application file for complete search history.

(56) References Cited

U.S. PATENT DOCUMENTS

| | | | | | |
|---|---|---|---|---|---|
| 517,971 | A * | 4/1894 | Bridgman | A45D 27/46 | 15/236.08 |
| 1,304,543 | A * | 5/1919 | Concannon et al. | A46B 13/001 | 15/164 |
| 2,946,076 | A * | 7/1960 | Morgan | A47L 1/16 | 15/236.08 |
| 3,041,650 | A * | 7/1962 | Day | A63C 11/08 | 15/236.05 |
| 3,139,641 | A * | 7/1964 | Grogan | A46B 13/005 | 451/490 |

(Continued)

*Primary Examiner* — Robert Canfield

(57) ABSTRACT

A sports equipment surface cleaning safety device is disclosed which serves the purpose of removal of materials, such as snow, ice or mud, from boot soles or other contacting surfaces of sports equipment through motions such as scraping or brushing. The device is intended to be integrated within, or mechanically mounted to a pole, such as a ski pole or trekking pole. It is constructed with materials such as plastics and/or metal, utilizing conventional methods of fabrication such as 3D printing, injection molding, gluing, casting, or machining.

11 Claims, 5 Drawing Sheets

(56) References Cited

U.S. PATENT DOCUMENTS

| | | | | | |
|---|---|---|---|---|---|
| 3,929,345 | A * | 12/1975 | Nasby | A63C 11/22 | 15/236.08 |
| 4,000,909 | A * | 1/1977 | Coale | A63C 11/22 | 280/813 |
| 4,018,014 | A * | 4/1977 | Belanger | B24D 13/06 | 15/230.14 |
| 4,145,062 | A * | 3/1979 | Stiemert | A63C 11/22 | 280/813 |
| 4,221,393 | A * | 9/1980 | Donahue | A63C 11/22 | 280/813 |
| 4,299,409 | A * | 11/1981 | Gedicks | A63C 11/22 | 135/66 |
| 4,573,710 | A * | 3/1986 | Ford | A63C 11/22 | 280/813 |
| 4,718,138 | A * | 1/1988 | Brown | A63C 11/22 | 280/813 |
| 4,939,807 | A * | 7/1990 | Hencz | A47L 1/06 | 15/160 |
| D327,369 | S * | 6/1992 | Russo, Jr. | D4/130 | |
| D340,585 | S * | 10/1993 | Kirk | D32/47 | |
| 5,358,277 | A * | 10/1994 | Klement, Jr. | A63C 11/22 | 280/813 |
| 5,471,696 | A * | 12/1995 | Linfoot | A47L 13/00 | 15/104.001 |
| 5,713,097 | A * | 2/1998 | Brown | A63C 11/18 | 15/236.08 |
| 6,779,221 | B2 * | 8/2004 | Bockes | A47L 13/44 | 15/247 |
| 6,817,055 | B1 * | 11/2004 | Ekholm | A46B 13/001 | 15/179 |
| 8,240,713 | B2 * | 8/2012 | Jacobs | A63C 19/062 | 280/809 |

| | | | | | |
|---|---|---|---|---|---|
| 8,925,136 | B2 * | 1/2015 | Huybreckx | A46B 7/00 | 15/179 |
| 9,521,900 | B2 * | 12/2016 | Kunnas | A46B 5/02 | |
| 9,700,126 | B2 * | 7/2017 | Dahlberg | F16B 33/002 | |
| 9,770,091 | B2 * | 9/2017 | Spinosa | A46B 9/04 | |
| 10,932,642 | B2 * | 3/2021 | Bardo | A47L 13/08 | |
| 11,066,249 | B2 * | 7/2021 | Baumgardner | A46D 1/0207 | |
| 11,109,723 | B2 * | 9/2021 | Rosenthal | A46B 11/0068 | |
| 11,219,300 | B2 * | 1/2022 | Gowen | A46B 9/026 | |
| 11,298,756 | B1 * | 4/2022 | Ciriniconi | B23B 5/168 | |
| 12,035,801 | B2 * | 7/2024 | Dunn | A46B 5/0095 | |
| 2003/0177597 | A1 * | 9/2003 | Wallace, III | A46B 17/06 | 134/900 |
| 2004/0172780 | A1 * | 9/2004 | Benton | A47L 17/00 | 15/105 |
| 2005/0071941 | A1 * | 4/2005 | Reynolds | B60S 3/045 | 15/245 |
| 2007/0101524 | A1 * | 5/2007 | Pfister | A63B 57/50 | 15/112 |
| 2008/0110149 | A1 * | 5/2008 | Pfister | A01D 7/00 | 56/400.04 |
| 2009/0273173 | A1 * | 11/2009 | Jacobs | A63C 19/062 | 280/821 |
| 2013/0111687 | A1 * | 5/2013 | Rolph | A47L 1/16 | 15/236.06 |
| 2016/0319696 | A1 * | 11/2016 | Clark | B08B 9/00 | |
| 2017/0021393 | A1 * | 1/2017 | Hasler | A47J 37/0786 | |
| 2017/0238781 | A1 * | 8/2017 | Walsh | A47L 13/08 | |
| 2019/0343269 | A1 * | 11/2019 | Waguespack | A46B 9/025 | |
| 2020/0305590 | A1 * | 10/2020 | Dunn | A46B 5/0095 | |
| 2020/0390226 | A1 * | 12/2020 | Gowen | A46B 9/028 | |
| 2021/0212535 | A1 * | 7/2021 | Kegg | A46B 7/10 | |
| 2025/0255446 | A1 * | 8/2025 | Wang | A47L 11/4002 | |

* cited by examiner

CLEANING DEVICE FOR CONTACTING SURFACES OF SPORTS EQUIPMENT

FIELD OF THE INVENTION

The present invention relates to the removal of materials, such as snow, ice or mud, from boot soles or other contacting surfaces of sports equipment to promote safe and optimal operation.

BACKGROUND OF THE INVENTION

A variety of outdoor sports equipment which interface with footwear rely upon low tolerances to enable the proper and secure mechanical coupling of components to safely perform within the intended operational envelope. The safe and intended performance of outdoor sports equipment can be impacted by the accumulation of snow, ice, mud, or other unwanted materials upon interfacing components such as the tread of a boot sole and equipment such as ski bindings and snowshoes. Additionally, the presence of unwanted materials may also mask damage or defects such as cracks and fractures in plastic or metal components. While operational impacts will vary with aspects such as the user, terrain, ambient weather conditions and manner of which the outdoor sports equipment is used; results can include reduced traction, slipping, increased weight of equipment worn or carried, and improper function of mechanical components. Occurrences such as these can lead to injuries associated with fatigue, slips and falls.

While other devices have been proposed as a possible solution, most exhibit shortcomings such as complex installation, potential harm to its users during installation and/or use, potential damage to associated equipment through methods of installation & operation, ergonomically awkward use or storage, or neglect the use-case demands to achieve longevity of product life. Despite the merits of these devices, few, if any, are in use today. Instead, numerous inefficient methods are typically used for self-removal of aforementioned unwanted materials including kicking nearby land features (trees, rocks, etc.), scraping with hands, or utilizing sticks or other pointed objects to remove unwanted materials from sports equipment. While these methods can be effective, sourcing of such rudimentary methods is not always feasible and damage to components leading to injury can occur.

BRIEF SUMMARY OF THE INVENTION

The present invention comprises a novel multimodal material-removing device which generally provides a solution to break-apart, dislodge, scrape, pull, pry, push or brush-off unwanted solid and semi-solid materials from surfaces such as footwear and sports equipment. The device is intended to be integrated onto, or within, or mechanically mounted to a pole or shaft, such as a ski pole or trekking pole.

The present invention is generally formed from a wide range of plastics and/or metals with characteristics suitable for the outdoor environment such as low temperatures and resistance to impact, axial and torsional forces associated with the intended use of the device. Embodiments of the present invention include two rigid, solid, thin walled, tubular halves with surface cleaning features formed in the outer surface of each component. Tubular halves are then mounted to a pole, by placing the pole within the inside of each tubular half and mechanically clamping each tubular half together with fasteners such as screws or bolts. In another embodiment, the surface cleaning features are embedded within the surface of the pole itself.

BRIEF DESCRIPTION OF THE DRAWINGS

Some embodiments of the present invention are demonstrated within the illustrations as an example and are not limited by the accompanying drawings, in which like references may indicate similar references and in which.

DETAILED DESCRIPTION OF THE INVENTION

Figure 1:
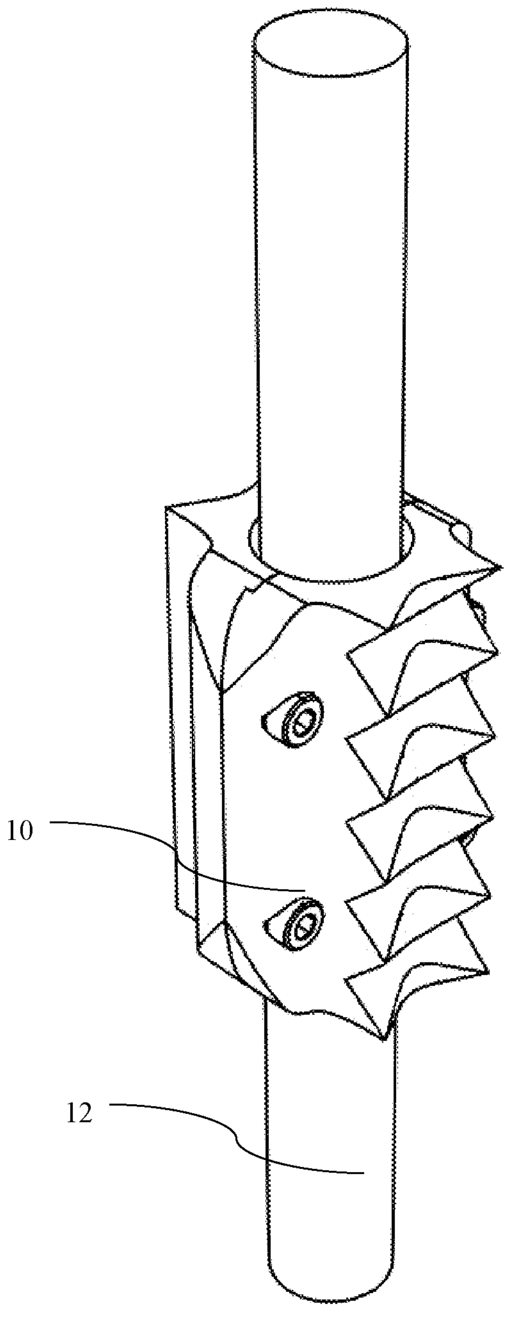
FIG. 1 is an isometric view illustrating a snow and ice removal device mounted to a ski pole.

A new cleaning device for sports equipment surfaces and methods for removing foreign material, and construction of the device are discussed herein. In the following description, for the purposes of explanation, numerous specific details are set forth in order to provide a thorough understanding of the present invention. It will be evident, however, to one skilled in the art that the present invention may be practiced without these specific details.

The terminology used herein is for the purpose of describing particular embodiments only and is not intending to be limiting of the present invention. As used herein, terms such as "and/or" include any and all combinations of one or more of the associated listed items. As used herein, the singular forms of "a", "an", and "the" are intended to include the plural forms as well as the singular forms, unless the context clearly indicates otherwise. It will be further understood that the terms "comprises, and/or "comprised", when used in this specification, specify the presence of stated features, step, operations, elements and/or components, but do not preclude the presence or addition of one or more other features, steps, operation, elements, components, and/or groups thereof. Additionally, reference in the specification to "one embodiment" or "an embodiment" or "another embodiment" is indicative that a particular feature, structure, or characteristic described in conjunction with the embodiment can be included in at least one embodiment of the present invention. The appearances of the phrase "in one embodiment" in various places in the specification do not necessarily all refer to the same embodiment.

Unless otherwise defined, all terms used herein have the same meaning as commonly understood by one having ordinary skill in the art to which the present invention belongs. It will be further understood that terms, such as those defined in commonly used dictionaries, should be interpreted as having meaning that is consistent with their meaning in the context of the relevant art and the present disclosure and will not be interpreted in an idealized or overly formal sense unless expressly so defined herein.

In describing the present invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the present invention and the claims.

Various embodiments and aspects of the present invention will be described with reference to details discussed below, and the accompanying drawings will illustrate the various embodiments. The following description and drawings are illustrative of the present invention and are not to be construed as limiting the present invention. Numerous specific details are described to provide a thorough understanding of various embodiments of the present invention. However, in certain instances, well-known or conventional details are not described in order to provide a concise discussion of embodiments of the present invention.

The present invention will now be described with reference to the appended figures, which illustrate representative embodiments of the invention. FIG. 1 illustrates one embodiment of the snow and ice removal device designated 10 mounted to a portion of a pole 12. The device may be used to remove unwanted material from footwear, sports equipment, or other contacted surfaces through actions such as striking, scraping, prying, pushing, pulling, brushing, and/or sweeping in linear and/or circular motions. The placement of the device on a pole and the manner in which the device is used may vary depending on user preference and application.

Figure 2:
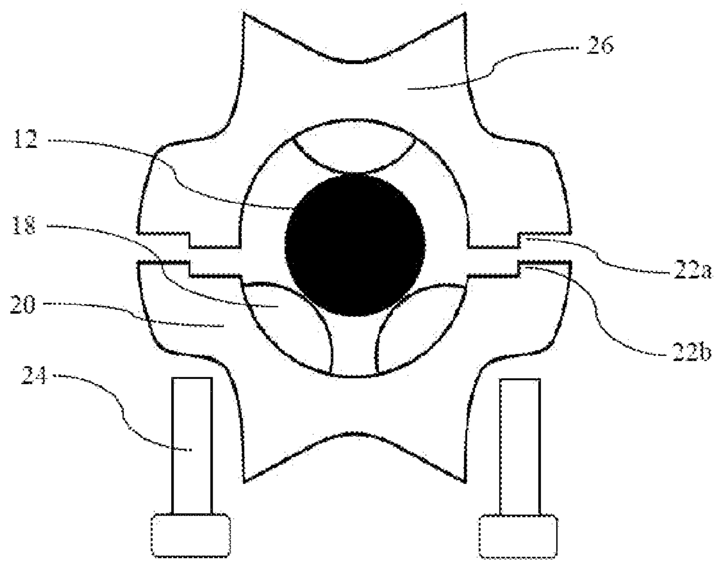
FIG. 2 is a top exploded view of a snow and ice removal device showing opposing tubular body halves and fasteners arranged for assembly.

In various embodiments, the snow and ice removal device may be positioned along a pole at a location convenient for user operation, such as along a lower portion of a ski pole near a basketed end. However, the position of the device along the pole is not limited thereto and may vary depending on user preference, pole type, and intended use. FIG. 2 illustrates one embodiment of attachment of the present invention to a pole 12, wherein mechanical clamping is achieved around an outer surface of the pole by mating two tubular halves 20 and 26. The tubular halves engage one another via interlocking channels 22*a* and 22*b* formed by complementary protrusions extending along opposing edges of each tubular half. Mechanical clamping of the tubular body halves is achieved using fasteners 24 positioned on opposing sides of the tubular body halves, thereby forming a completed tubular assembly 10 configured to engage a pole. The mechanical clamping system permits the cleaning device to be positioned and repositioned at substantially any location along the length of the pole. In some embodiments, through-holes 28*a* and 28*b* are formed through the outer walls of the tubular body halves and are oriented substantially perpendicular to the longitudinal axis of the device. The through-holes are configured to receive fasteners 24 that engage threaded nuts positioned within nut-receiving cavities 32 formed in the wall of the opposing tubular body half, thereby enabling mechanical clamping of the tubular body halves around the pole.

In one embodiment, tubular half 26 represents a removable and interchangeable body half that may be selectively provided in different configurations. Exemplary configurations include a first variant 26*a* having blade-like material-removal features and a second variant 26*b* having brush elements, as illustrated respectively in FIGS. 4 and 5. Each variant is configured to mate with tubular half 20 using the same interlocking channel and fastener arrangement. In one embodiment, one or more compliant pads 18 may be positioned within same-shaped extrusion cuts along inner surfaces of the tubular halves to facilitate secure engagement with poles of varying diameters. The compliant pads may be arranged in a complementary pattern between opposing tubular halves, thereby enabling the assembly to resist torsional and axial forces applied during use and enabling removal of the device from the pole without damaging the pole surface. The number, placement, and configuration of the compliant pads may be varied to accommodate different pole geometries and mounting requirements.

Figure 3:
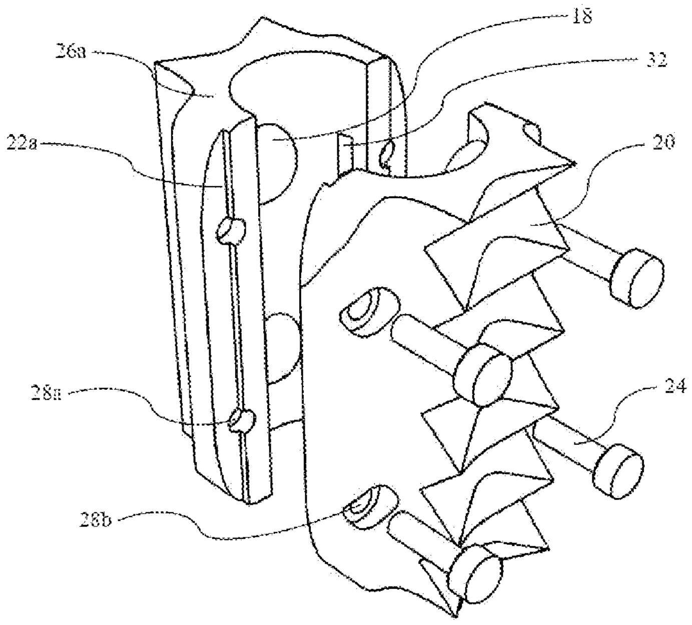
FIG. 3 is an exploded isometric view of the snow and ice removal device, showing two rows of symmetrically spaced pyramidal protrusions extending outward from the exterior surface of the tubular body half.
Figure 4:
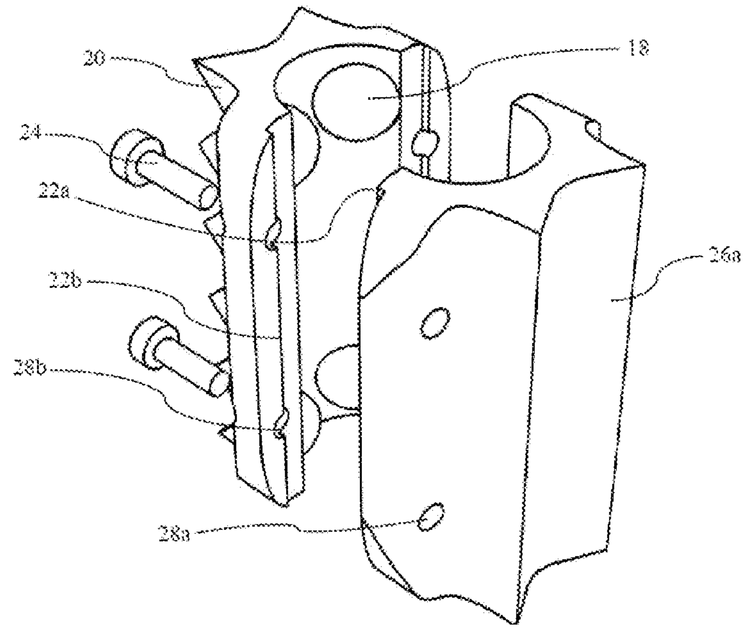
FIG. 4 is an exploded isometric view of the snow and ice removal device showing two rows of straight blade-like edges protruding from an outer surface of an opposing tubular body half.
Figure 5:
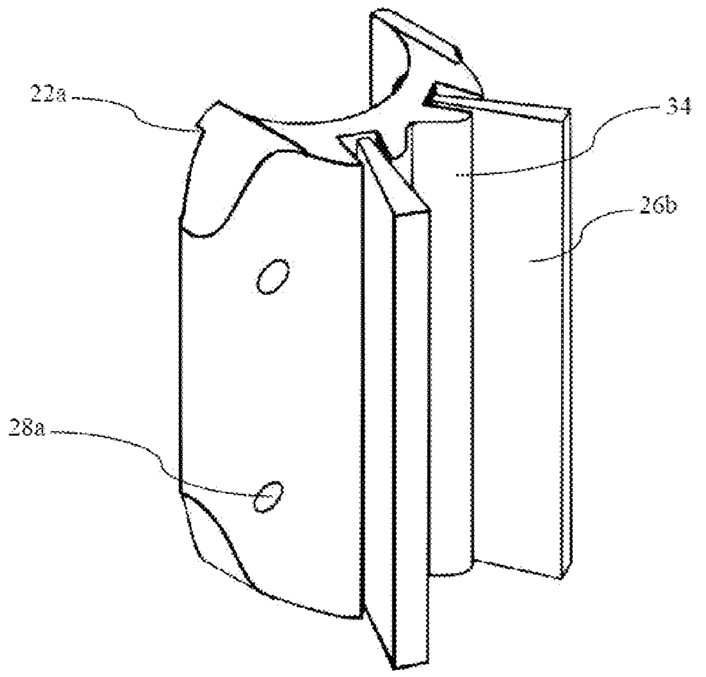
FIG. 5 is an isometric view of a tubular body half of a snow and ice removal device having one or more brush elements.

In one embodiment of the present invention, the tubular body halves include outwardly protruding material-removal features configured to engage snow, ice, or other accumulated material on footwear or sports equipment. The exterior surfaces of the tubular halves may include curved outer faces conforming generally to the cylindrical shape of the pole, with material-removal features projecting outwardly therefrom. FIGS. 3-5 illustrate representative embodiments of such material-removal features formed on interchangeable tubular body halves. As illustrated in FIG. 3, one tubular body half 20 includes one or more rows of symmetrically spaced pyramidal protrusions extending outward from the exterior surface of the tubular body half. The pyramidal protrusions are configured to fracture, dislodge, or break up compacted snow, ice, or debris adhered to a contacted surface during use. As illustrated in FIG. 4, an interchangeable tubular body half 26*a* includes one or more rows of blade-like edge structures extending outward from the exterior surface of the tubular body half. The blade-like edges may be generally straight and oriented substantially parallel to the longitudinal axis of the pole, and are configured to scrape, shear, or push material from a contacted surface. As illustrated in FIG. 5, an alternative interchangeable tubular body half 26*b* includes one or more brush elements extending outward from the exterior surface of the tubular body half. The brush elements may comprise linear strip brushes, bristle assemblies, or similar compliant cleaning structures secured within channels 34 formed in the exterior surface of the tubular body half 26*b*. In embodiments including brush elements, the brushes may be formed from materials such as nylon or other polymers selected for resistance to ultraviolet exposure, moisture, corrosion, and low-temperature embrittlement. The brush elements may be press-fit, adhesively secured, mechanically retained, or otherwise affixed within the tubular body half. In use, a user may selectively orient the pole to expose different material-removal features depending on the condition of accumulated material, including initially breaking up compacted debris with pyramidal protrusions and subsequently performing finer cleaning with blade-like edges or brush elements.

The present invention, in any embodiment, may be fabricated using a wide variety of materials and manufacturing processes. Suitable materials may be selected to provide resistance to ultraviolet exposure, moisture, rust, and corrosion, while also exhibiting sufficient impact strength, tensile strength, and resistance to brittleness at low temperatures. Exemplary materials include, but are not limited to, nylon, carbon fiber, polycarbonate, and aluminum. Fabrication methods may include additive manufacturing, casting, machining, injection molding, or combinations thereof.

Figure 6:
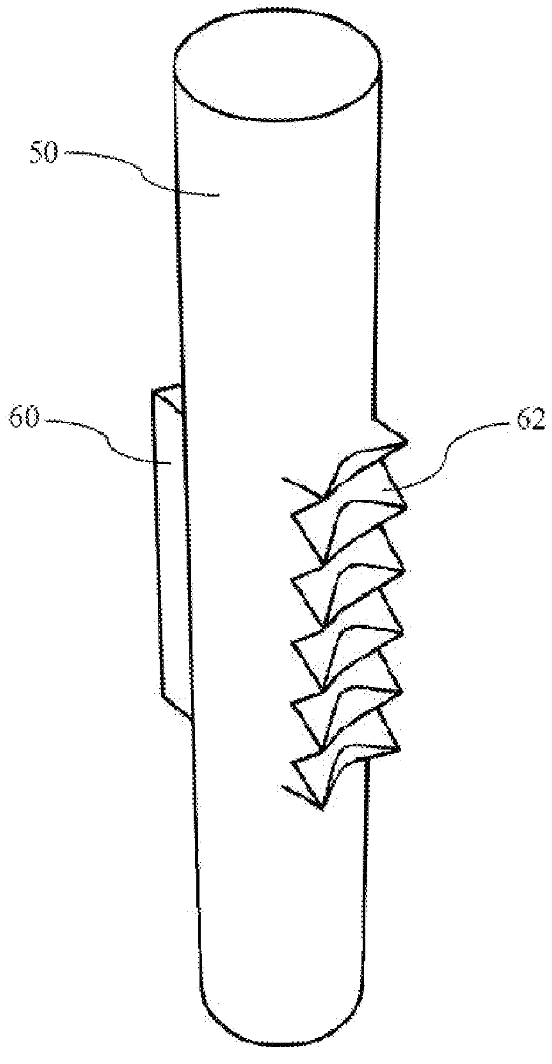
FIG. 6 is an isometric view of a pole having material-removal features embedded therein.
Figure 7:
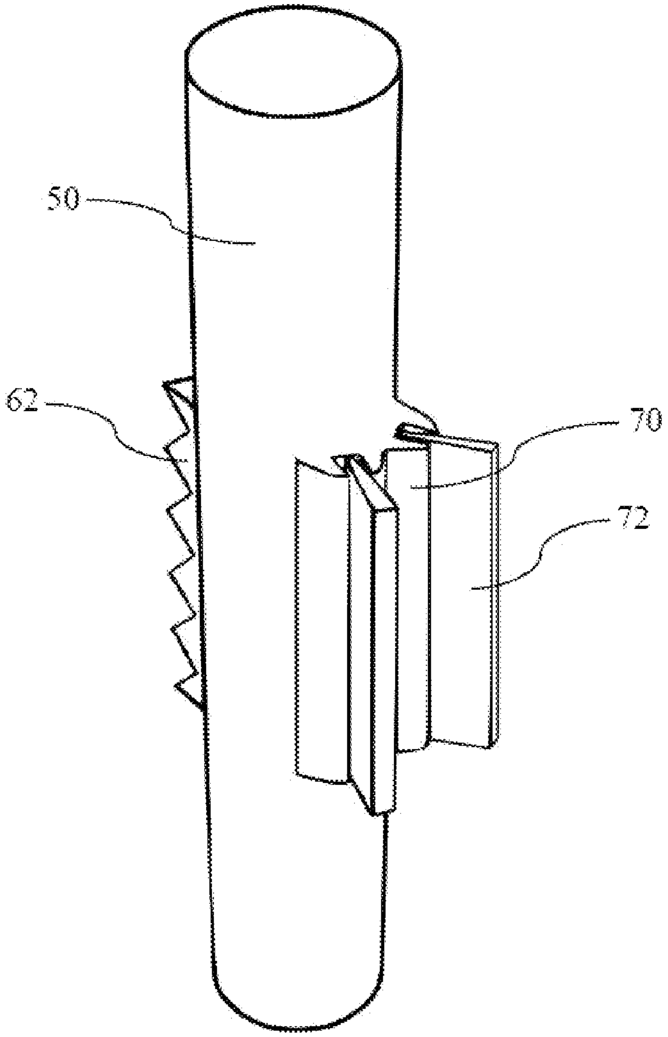
FIG. 7 is an isometric view of a pole having brush elements embedded therein.

In an alternative embodiment of the present invention, one or more material-removal features are integrated directly into an outer surface of a pole 50, such as a ski pole or trekking pole, rather than being mounted via a removable tubular assembly. In this embodiment, the material-removal features form part of the pole structure itself and are positioned along a defined cleaning region of the pole, which may extend along a selected portion of the pole length based on intended use. This configuration eliminates the need for a separate clamping body while providing a fixed cleaning region suitable for user interaction during use. The embedded material-removal features may be formed through molding, machining, casting, additive manufacturing, or other suitable manufacturing processes. As illustrated in FIG. 6, the embedded-feature embodiment may include one or more rigid material-removal features formed directly in the outer surface of the pole 50. In one embodiment, such features include embedded blade-like edges 60 and/or embedded pyramidal protrusions 62 extending outward from the pole surface. The rigid embedded features 60, 62 are configured to fracture, dislodge, or break up compacted snow, ice, or debris adhered to footwear or sports equipment surfaces during use. As illustrated in FIG. 7, the embedded-feature embodiment may alternatively or additionally include one or more embedded brush elements 70 secured within brush-receiving channels 72 formed in the outer surface of the pole 50. The embedded brush elements 70 may comprise linear strip brushes, bristle assemblies, or similar compliant cleaning structures extending along a cleaning region of the pole. The embedded brush elements 70 may be used independently or in combination with the rigid embedded material-removal features 60, 62. In embodiments wherein blade-like edges are embedded into the pole, the blade geometry may correspond to the blade-like edge structures illustrated in FIG. 4, integrated into the outer surface of the pole in a manner similar to the embedded embodiments shown in FIGS. 6 and 7.

The invention claimed is:

1. A cleaning device for footwear and sports equipment surfaces comprising:

- a first tubular body half and a second tubular body half, each defining a semi-cylindrical inner surface configured to collectively form a cylindrical bore when mated;
- each tubular body half including longitudinally extending complementary interlocking channel structures formed along opposing mating edges and extending substantially the entire height of the tubular body halves;
- at least one fastener extending through aligned through-holes formed in the tubular body halves and engaging a threaded nut retained within a nut-receiving cavity formed within a wall of at least one tubular body half;
- wherein tightening of the at least one fastener draws the tubular body halves together to mechanically clamp the cylindrical bore around an exterior surface of a pole; and
- at least one of the tubular body halves including a plurality of outwardly projecting material-removal features formed along an exterior surface thereof.

2. The cleaning device of claim 1, wherein the longitudinally extending interlocking channel structures comprise complementary protrusions and recesses formed along the mating edges of the tubular body halves and extending substantially the full height thereof, the interlocking channel structures being configured to resist relative rotational movement between the tubular body halves independent of clamping force applied by the fastener.

3. The cleaning device of claim 2, wherein at least one of the tubular body halves is configured to be selectively interchangeable with an alternative tubular body half having complementary interlocking channel structures and compatible fastener alignment features, such that the alternative tubular body half may be mated with the other tubular body half to form the cylindrical bore.

4. The cleaning device of claim 1, wherein the at least one fastener comprises a plurality of fasteners extending through respective through-holes oriented substantially perpendicular to a longitudinal axis of the tubular body halves, each fastener engaging a threaded nut retained within the nut-receiving cavity of the opposing tubular body half.

5. The cleaning device of claim 1, wherein the tubular body halves are configured to be secured to and removed from the pole solely by tightening and loosening the at least one fastener, the cylindrical bore frictionally engaging the exterior surface of the pole when the fastener is tightened and releasing from the pole when the fastener is loosened, without permanent modification of the pole.

6. The cleaning device of claim 1, wherein one or more compliant pads are positioned within recesses formed in the semi-cylindrical inner surface of at least one tubular body half, the compliant pads being configured to frictionally engage the pole and to permit adjustment of an effective bore diameter by selective addition or removal of the compliant pads.

7. The cleaning device of claim 1, wherein the tubular body halves are selectively repositionable along a length of the pole by loosening and retightening the at least one fastener, thereby enabling non-destructive attachment and removal of the device at multiple selectable positions without modification of a pole surface.

8. The cleaning device of claim 1, wherein at least one exterior surface of the device comprises a colored material, pigment, coating, and/or surface treatment selected to enhance durability and resistance to ultraviolet exposure, moisture, corrosion, abrasion, and low-temperature embrittlement during outdoor use.

9. The cleaning device of claim 1, wherein the at least one tubular body half includes a plurality of outwardly projecting wedge-shaped features defining blade-like edge structures on the exterior surface thereof.

10. The cleaning device of claim 1, wherein the at least one tubular body half includes one or more brush elements secured within channels formed in the exterior surface and/or directly embedded within the exterior surface of the tubular body half, the brush elements projecting outward from the exterior surface.

11. The cleaning device of claim 1, wherein the outwardly projecting material-removal features comprise a plurality of symmetrically spaced pyramidal protrusions extending outward from the exterior surface of the at least one tubular body half.

* * * * *